J. L. CREVELING.
HOSE COUPLING.
APPLICATION FILED JUNE 30, 1909.
972,829.
Patented Oct. 18, 1910.
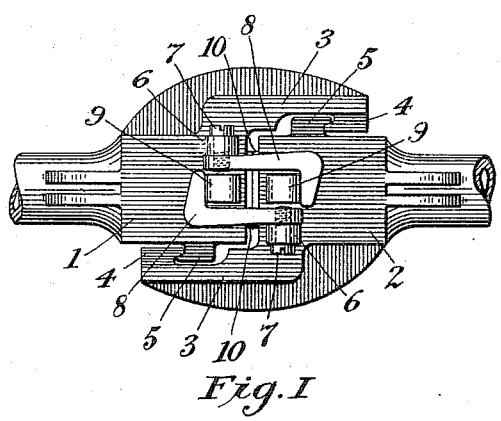
Fig. I
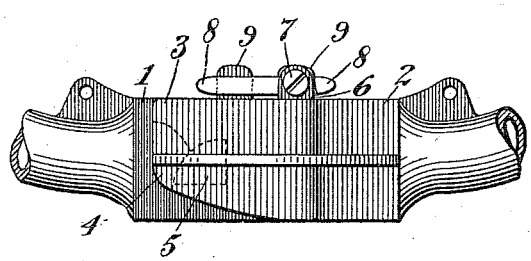
Fig. II

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

HOSE-COUPLING.

972,829.  Specification of Letters Patent.  Patented Oct. 18, 1910.

Application filed June 30, 1909. Serial No. 505,160.

*To all whom it may concern:*

Be it known that I, JOHN L. CREVELING, a resident of New York, in the county and State of New York, have invented certain new and useful Improvements in Hose-Couplings, as set forth in the annexed specification and drawing forming a part thereof.

My invention relates to that class of hose couplings used for quickly uniting two sections of hose by a downward rocking motion such as are usually known as "the gravity straight port type."

My invention has for its particular object to provide means whereby such couplers may be locked together in such manner as not to be readily opened by a tendency toward an upward movement such as is often caused by railway trains, where these couplers are employed, when running around sharp curves, or where excessive pressures are apt to be used.

In the drawing Figure I shows a top plan of a hose coupling embodying my invention. Fig. II shows a side elevation of a hose coupling embodying my invention as shown in Fig. I.

Referring to the drawing, the coupling is shown as made of two like halves which are indicated by the numerals 1 and 2. Each half, or coupling member, is provided with a lateral extension 3 carrying a hook thereon indicated at 4. On the opposite side of each member there is provided a hook, or boss, indicated at 5 and adapted to engage the hook 4 of the opposite member when the two members are swung together by the downward movement as will be well understood by all those skilled in the art. Each coupling member is provided with a gasket 10 registering with the opening through the coupler and as the two members are swung together, as above mentioned, these gaskets are brought together so as to form a fluid tight joint. The members are each provided with a boss 6 drilled out to receive the screw 7 in such manner as to be free to revolve therein. The screw 7 is threaded into and carries the hook 8 adapted to engage the boss 9 of the opposite member when in place in such manner that, when the couplings are made up as shown in the drawing, the hook of each member may be thrown over and caused to engage the boss 9 on the other member in such manner as to prevent the couplings from being readily separated by any upward movement.

It will be obvious that I have provided means of locking the couplings together wherein the parts, liable to wear, may be easily renewed and of very simple construction, also that in case it be desired to use the couplings in the usual way without the locks, they may be swung back and left disengaged.

Having thus described my invention what I consider new and desire to protect by Letters Patent is as set forth in the following claims to wit:

1. A hose coupling comprising two like members adapted to be operatively coupled by a downward swinging movement, having independent locking means upon the upper side thereof comprising a boss upon each member, a hook carried thereby and a boss adapted to be engaged by the hook of the opposite member.

2. A hose coupling comprising two substantially like members and means for holding the same in operative relation, combined with locking means comprising a boss upon the upper side of each member, a hook carried thereby and a boss adapted to engage the hook of the other member.

3. A hose coupling comprising a pair of substantially identical members and means carried by each member for engaging the other member so as to hold said members in operative relation to each other, combined with means whereby the members may be retained in said relation comprising a hook-supporting member carried by each coupling member upon the upper side thereof, a hook carried thereby and a boss upon each member adapted to be engaged by the hook of the other member.

4. A hose coupling comprehending two substantially like members each adapted to engage the other so as to maintain an operative relation therewith and means for preserving said operative relation, comprising a hook carried by a boss upon the upper side of each coupling member and an engaging boss upon the upper side of each coupling member and adapted to be engaged by the hook of the other coupling member.

5. A hose coupling comprehending two substantially like parts adapted to be coupled together by a downward swinging movement in such manner as to form a fluid tight joint between the members, combined with means for holding the members together comprising a boss located above the fluid joint and a hook carried thereby and a boss adapted to be engaged by the hook of the other member.

6. A hose coupling comprising two substantially like members with means for holding the same in operative relation, a boss upon each member, a hook carried independently of said boss and adapted to engage the boss of the other member.

7. In a hose coupling member, means for operatively engaging a like member, means of holding the member in said operative position, comprising a boss and hook carried independently upon the upper side thereof and adapted to engage a boss upon another coupling member.

8. A hose coupling comprising two substantially like members having means for holding the same in operative relation and means for locking the same in said operative relation comprising a boss upon each member substantially on the median line thereof, a hook carried by each member independently of said boss and adapted to engage the boss of the other member substantially on the median line.

JOHN L. CREVELING.

Witnesses:
 EDNA HALL,
 C. J. STOCKLEY.